April 18, 1967  G. P. SAUBERLICH  3,315,257
APPARATUS AND METHOD FOR GEODETIC-SURVEYING SYSTEM
Filed Aug. 12, 1964  4 Sheets-Sheet 1
*Fig. 1.*
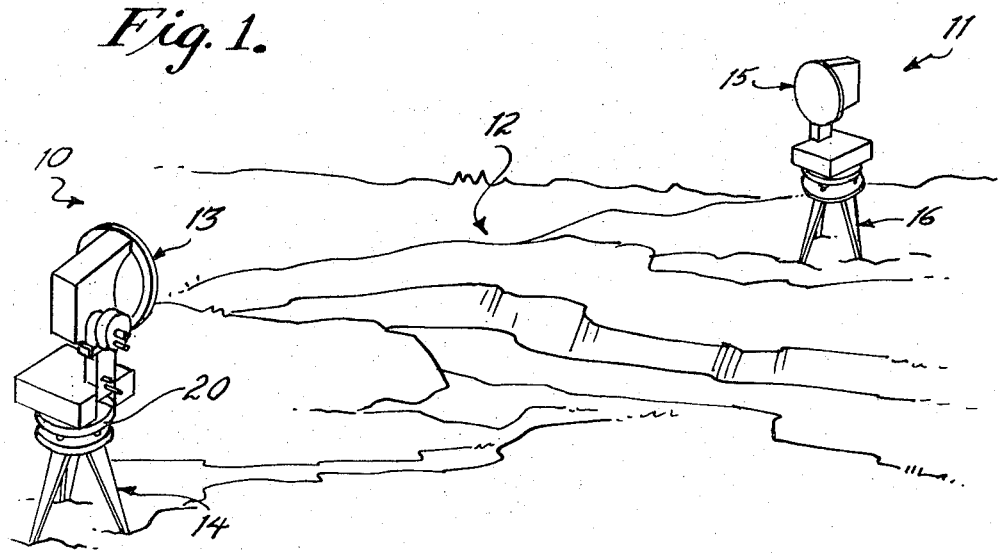
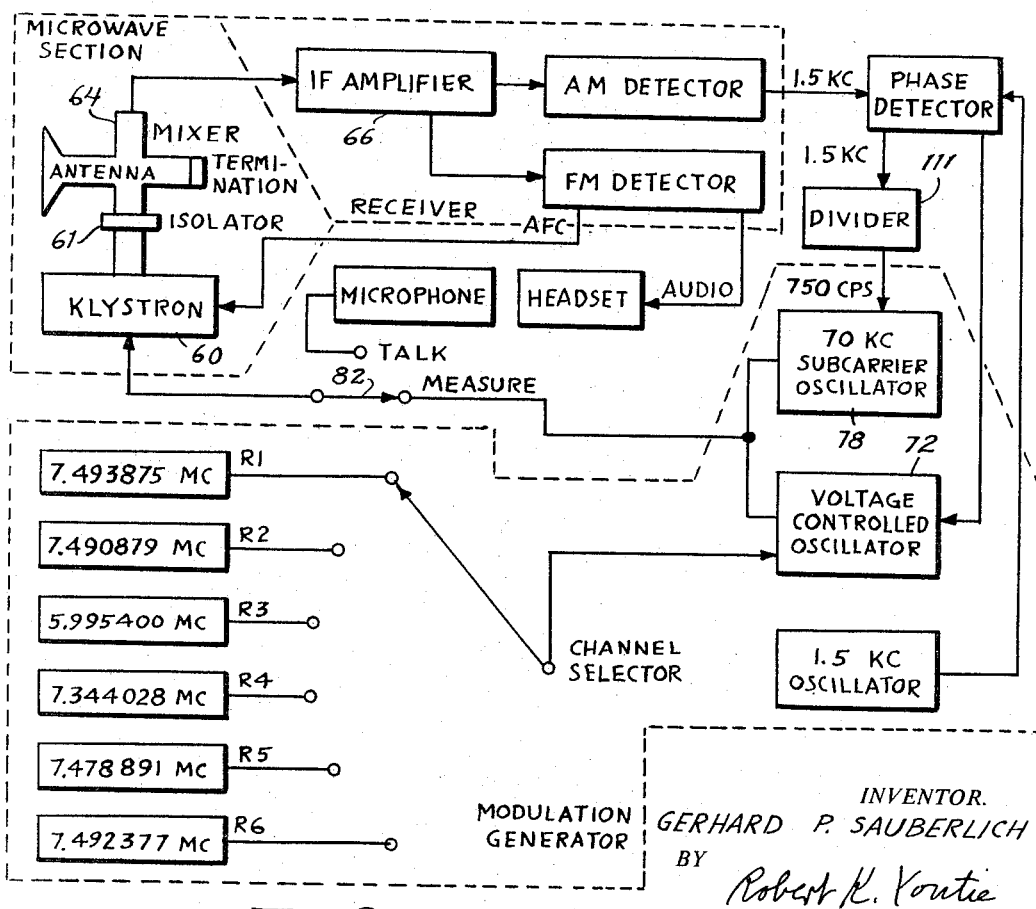
*Fig. 8.*
INVENTOR.
GERHARD P. SAUBERLICH
BY
Robert K. Youtie
ATTORNEY.

April 18, 1967     G. P. SAUBERLICH     3,315,257
APPARATUS AND METHOD FOR GEODETIC-SURVEYING SYSTEM
Filed Aug. 12, 1964     4 Sheets-Sheet 2

INVENTOR.
GERHARD P. SAUBERLICH
BY Robert K. Youtie
ATTORNEY

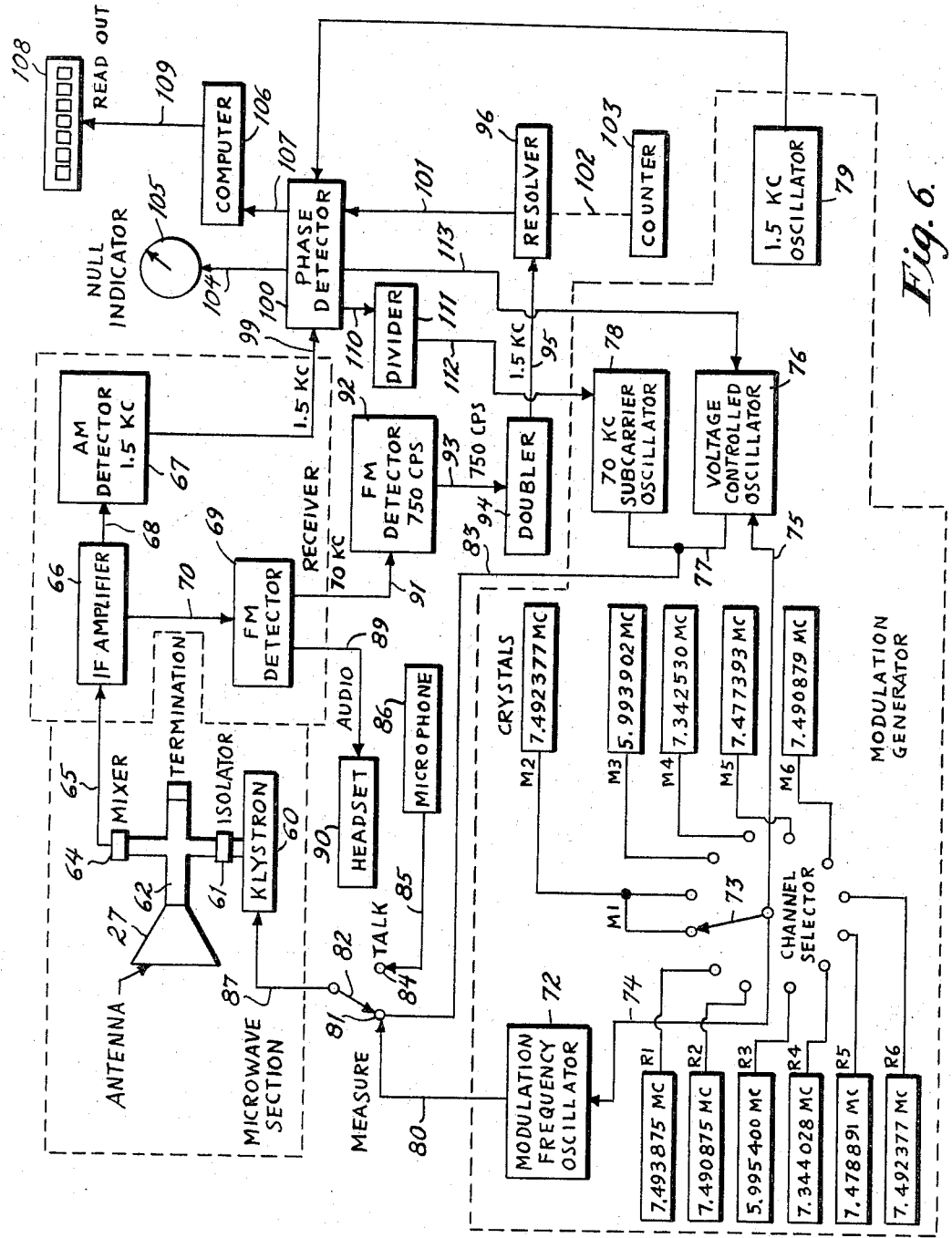

April 18, 1967  G. P. SAUBERLICH  3,315,257
APPARATUS AND METHOD FOR GEODETIC-SURVEYING SYSTEM
Filed Aug. 12, 1964  4 Sheets-Sheet 4

INVENTOR.
GERHARD P. SAUBERLICH
BY
Robert K. Youtie
ATTORNEY.

United States Patent Office 3,315,257
Patented Apr. 18, 1967

3,315,257
APPARATUS AND METHOD FOR GEODETIC-SURVEYING SYSTEM
Gerhard P. Sauberlich, 924 Mansion St.,
Collingswood, N.J. 08108
Filed Aug. 12, 1964, Ser. No. 389,128
5 Claims. (Cl. 343—12)

This invention relates generally to apparatus and methods for long-distance measurements, and is particularly concerned with geodetic surveying. This application is a continuation-in-part of my copending patent application Ser. No. 186,805, filed Apr. 11, 1962, now abandoned.

It is an object of the present invention to provide a unique geodetic-surveying system utilizing optical and electronic components which permits of extremely accurate geodetic measurements throughout a relatively great distance range of approximately 300 feet to 35 miles.

It is another object of the present invention to provide a geodetic-surveying system of the type described wherein the physical parts thereof are relatively small and light in weight for ease of portability, and which affords faster operation than heretofore possible, being well suited for automatic encoding and computed readout, for substantially instantaneous results.

It is a further object of the present invention to provide a geodetic-surveying system having the advantageous characteristics mentioned in the preceding paragraphs which is capable of extreme accuracy in distance measurement, on the order of 1.5 cm. plus four parts per million, requires relatively little power, about 3 amps. at 12 volts, is adapted to operate satisfactorily under substantially all physical and climatic conditions, and which is extremely reliable and durable throughout a long useful life.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a perspective view illustrating the system in its operative condition of use;

FIGURE 6 is an electrical schematic of each instrument of the present invention;

FIGURE 8 is an electrical schematic showing the operating functions of the other instrument of the present system.

Figure 2:
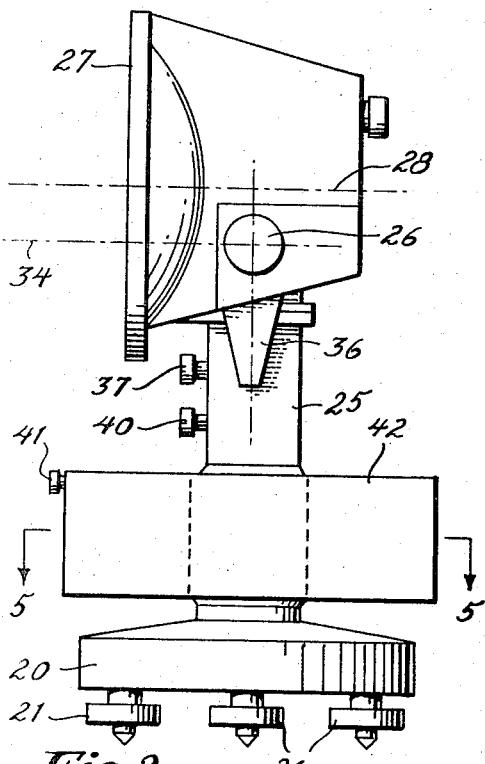
FIGURE 2 is a side elevational view showing a single instrument of the instant system.
Figure 4:
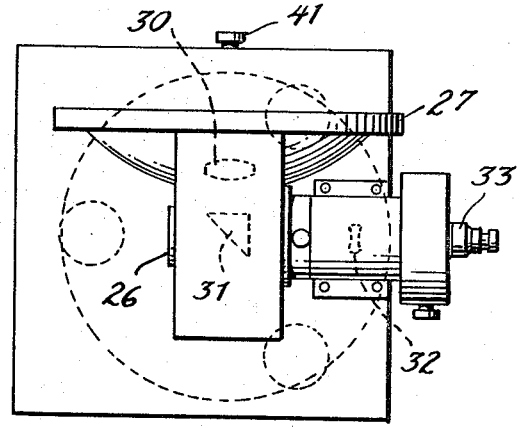
FIGURE 4 is a top plan view of the instrument of FIGURE 2.
Figure 5:
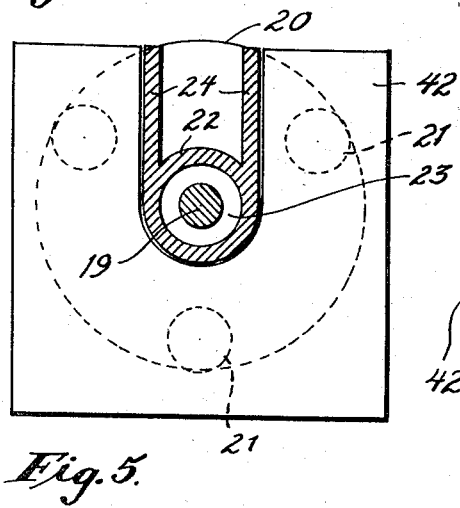
FIGURE 5 is a horizontal section taken generally along the line 5—5 of FIGURE 2.
Figure 3:
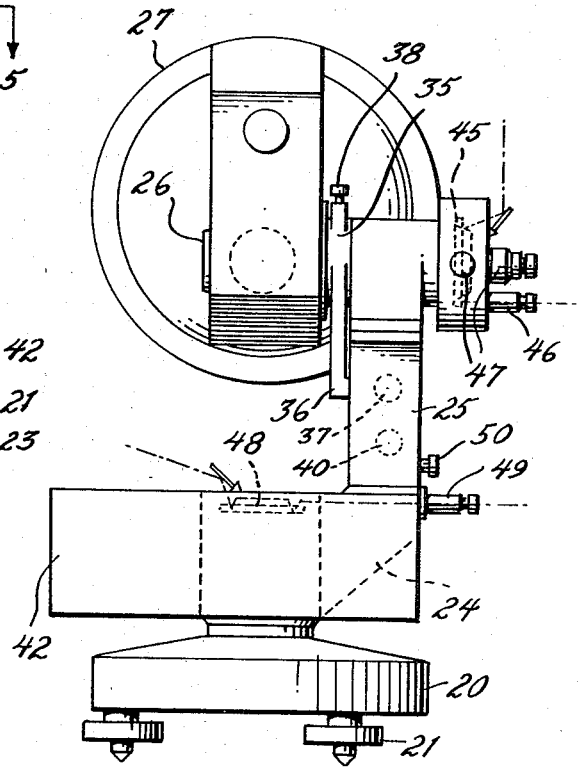
FIGURE 3 is a rear elevational view of the instrument of FIGURE 2.

Referring now more particularly to the drawings, and specifically to FIGURE 1 thereof, a pair of instruments are there respectively designated 10 and 11, and illustrated in operative surveying condition spaced apart over a terrain 12. The instruments 10 and 11 may be substantially identical, as will appear more fully hereinafter. The instrument 10 may include an operating unit 13 and mounting means 14, such as a tripod, while the instrument 11 may include operating unit 15 and a tripod or other suitable mounting means 16. With the instruments 10 and 11 located at their respective spaced positions, the operating units 13 and 15 are optically and electronically aligned for reading of the angular and distance measurements.

As each of the instruments 10 and 11 may be identical, a detailed description of one will suffice. One such instrument is shown in FIGURES 2–5, say instrument 10, apart from its mounting means. The instrument 10 includes a normally horizontal base member or plate 20, which may be of generally circular-plan configuration and is provided on its underside with depending leveling screws 21, say three in number to seat on the upper end of the support or tripod 14. Upstanding generally centrally of the base member 20, and substantially normal thereto is a journal post 19. A generally vertical sleeve 22 is axially circumposed about the post 19, being freely rotatable about the axis thereof, as by suitable bearing means 23.

An arm extends generally radially from the sleeve 22 and may be constituted of a pair of generally vertical walls or webs 24 extending in parallelism with each other from diametrically opposed regions of the sleeve 22. Upstanding generally vertically from the arm 24, generally parallel to and spaced from the axis of post 19, is a column 25. Journaled in the upper end of the column 25 is a shaft 26 which extends generally horizontally inwardly from the column such that the axis of shaft 26 intersects with the axis of post 19.

Mounted on the shaft 26, for rotation thereabout, is a directional antenna 27, say of parabolic configuration. The antenna 27 is mounted on the shaft 26 with the antenna axis spaced from and lying in a plane normal to the axis of the shaft. The antenna axis is represented by the dot-and-dash line 28.

Mounted in the antenna 27 and shaft 26 is a telescope represented by the optical components 30, 31, 32 and 33. That is, the objective lens 30 is carried by the telescope 27 for rotation therewith about the axis of shaft 26, while the prism 31 is also rotatable with the telescope about the shaft axis and has its reflecting surface coincident with the shaft axis. Further, the telescope focusing lens 32 is coincident with the axis of shaft 26, as is the telescope eyepiece 33, which may project outwardly away from the column 25. The optical axis of telescope 30–33, as determined by the axis of objective lens 30, is represented by the dot-and-dash line 34 and extends parallel to the antenna axis lying in the same vertical plane as the latter, which plane is normal to the axis of shaft 26. Further, the optical telescope axis 34 intersects with the axis of shaft 26.

Thus, the axes 28 and 34 of the antenna 27 and telescope 30–33 are in close parallelism with each other in all positions of adjustment.

In order to adjust the antenna 27 and telescope 30–33 vertically, that is to rotate the same about the horizontal axis of shaft 26, a yoke 35 is rotatable about the shaft and fixed to the antenna having an arm 36 depending along and entering into the column 25. A lead screw 37 may be rotatably mounted in the column 25 and threadedly engaged with the yoke arm 36 to rotate the latter about the shaft 26 and thus effect vertical adjustment of the antenna 27 and telescope 30–33. The lead screw 37 thus serves as the vertical-tangent screw. In addition, a clamping or setscrew 38 may be threaded through the yoke 35 for clamping engagement with the shaft 26 to fix the antenna 27 and telescope 30–33 in position, the screw 38 thus serving as the vertical clamp.

A horizontal-tangent screw is shown at 40 being mounted on the column 25 for effecting rotative adjustment of the latter about the axis of post 21, while a horizontal clamp or clamping screw is shown at 41 for releasably clamping the column, as by its sleeve 22 against rotation about the post 21. The horizontal clamp 41 may extend through a casing 42 detachably located in position extending substantially about the sleeve 22, the purpose of which will appear more fully hereinafter.

In order to read the angle of vertical adjustment, the column 25 may carry a calibrated vertical circle 45, substantially axially of the shaft 46 and outward of the column 25. The vertical circle 45 is advantageously provided with automatic horizontation. An ocular 46 is provided for reading the vertical circle, and an optical micrometer 47 is associated therewith.

Carried by the mounting sleeve 22 of column 25 may be a calibrated horizontal circle 48 having associated therewith a reading ocular 49 and an optical micrometer 50. Thus, angular positions of adjustment about the shaft 26 and post 21 are respectively observable by the oculars or eyepieces 46 and 49.

As thus far described, the apparatus may serve as a theodolite. In combination therewith is an electronic system which may be carried by the casing 42.

The electronic system is shown diagrammatically in FIGURE 6, which system is employed in each instrument 10 and 11. The antenna 27 is part of a microwave section wherein a microwave carrier-frequency generator or klystron 60 is connected through an isolator 61 to a hybrid T wave guide 62. The wave guide 62 is connected to the antenna 27 and a wave-guide termination 63 to split the klystron power between the antenna and termination. A mixer 64 is also connected to the wave guide 62 for mixing signals from the antenna 27 and klystron 60.

The mixed signals from the mixer 64 pass, as by conductor 65 to a receiver section, initially passing to an intermediate-frequency amplifier 66. The receiver section includes an amplitude-modulation detector 67 connected by conductor 68 to the amplifier 66, and also a frequency-modulation detector 69 connected by a conductor 70 to the amplifier.

A modulation generator section includes a modulation-frequency oscillator 72 and a plurality of crystals adapted for selective connection by a channel selector switch 73 through a conductor 74 to the oscillator 72. The crystals may be of the designated frequencies and are subdivided into two groups, a group of measuring crystals being respectively designated M2, M3, M4, M5 and M6, and a group of responding crystals being respectively designated R1, R2, R3, R4, R5 and R6.

The channel selector switch 73 is connected by a conductor 75 to a voltage-controlled oscillator 76 which is connected in turn by a conductor 77 to a subcarrier oscillator 78, which may be of a 70 kc. frequency. Also part of the modulation generator section is an oscillator 79, which may be of 1.5 kc. frequency.

The modulation-frequency oscillator 72 is connected by a conductor 80 to the "measure" terminal 81 of a "measure-talk" switch 82. Also connected to the "measure" terminal 81 are the oscillators 76 and 78, as by a conductor 83 connected to the conductor 77. The "talk" terminal 84 of the "measure-talk" switch 82 is connected by a conductor 85 to a microphone 86. The "measure-talk" switch 82 is connected by a conductor 87 to the carrier-frequency generator 60 for impressing modulation on the carrier frequency.

From the FM detector 69 of the receiver section extends a conductor 89 connected to a speaker or headset 90. Also from the FM detector 69 extends a conductor 91 to an FM detector 92 for detecting 750 c.p.s. The output of the detector 92 is connected by a conductor 93 to a multiplier or doubler 94 which transmits 1.5 kc. by conductor 95 to a resolver 96.

From the AM detector 67 there passes a 1.5 kc. signal, as by conductor 99 to a phase detector 100.

The resolver 96 passes its 1.5 kc. signal, as by a conductor 101 to the phase detector 100, and optionally, as by conductor 102 to a counter 103.

The phase connector is connected, as by conductor 104 to a null indicator 105 and may also be connected to a computer 106 by a conductor 107. The computer 106 may include visual readout means 108 connected to the computer by a conductor 109.

The phase detector 100 is also connected by a conductor 110 through a divider 111 and a conductor 112 to the subcarrier oscillator 78. An additional conductor 113 connects the phase detector to the voltage-control oscillator 76.

Figure 7:
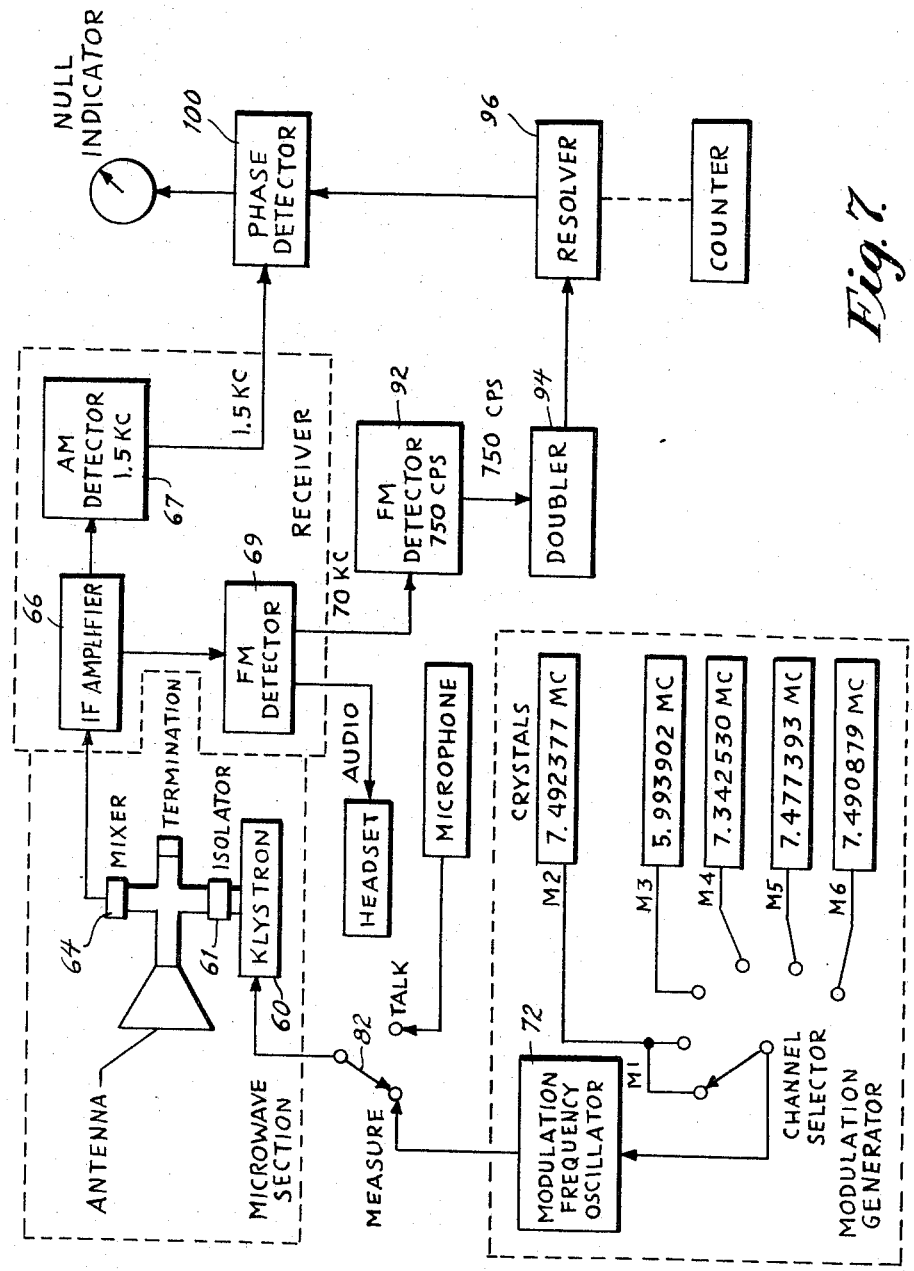
FIGURE 7 is an electrical schematic showing the operating functions of one instrument of the instant system.

The circuitry described above may be employed in either of two modes, as a measurer, shown in FIGURE 7, or as a responder, shown in FIGURE 8. In operation, one of the instruments 10 and 11 functions as a measurer and the other functions as a responder. With the instruments 10 and 11 in optical alignment, and the angles of adjustment noted, the interinstrument distance may be accurately measured.

In general, the theory of operation is that of measuring phase shift of a signal as proportional to distance traveled. In practice, the transmitters may operate over a frequency range of approximately 10.150 to 10.350 gigacycles. By obtaining a series of measurements at different frequencies within this band, severe multipath conditions will be revealed, and minor multipath effects will average out.

In both the measurer and responder functions, as seen in FIGURES 7 and 8, the klystron 60 supplies the microwave carrier signal and is frequency-modulated by the crystal-controlled continuous-wave oscillator 72. The phase shift of the modulation frequency in transmission between units is the significant feature of distance determination. The oscillator in the measurer unit used for the highest resolution modulation frequency advantageously has a frequency stability greater than one part per million. The phase-measurement circuitry advantageously has a resolution capability of one part per thousand per cycle of phase shift. To measure distance increments to one centimeter, an equivalent modulation wave length of 10 meters is indicated.

In use, the measurer microwave frequency is set at a predetermined frequency, say 10.25 gc., while the responder microwave frequency is set at a predetermined difference from that of the measurer, say 46.5 mc. The responder frequency may be above or below the measurer frequency.

In each microwave section the measurer and responder signals are combined in the mixer 64, and the resultant difference frequency (46.5 mc.) is processed in the IF amplifier 66.

The microwave carrier of each instrument is frequency-modulated by a stable continuous-wave modulation frequency having an index approximately unity. The modulation frequencies of the measurer and responder differ by 1.5 kc. Upon mixing of the modulation frequencies in each instrument there is produced an amplitude-modulated 1.5 kc. data signal, which data signals contain the phase-shift information that is proportional to the distance between instruments.

In order to compare the phase of the 1.5 kc. data signals, it is necessary to have both signals available at the same instrument, the measurer instrument as employed herein. Hence, the responder data signal is transmitted to the measurer for this comparison.

In order to avoid problems of interference, the data signal of the responder is changed in frequency, say divided by two through the divider 111 and employed to modulate a subcarrier frequency, say the 70 kc. frequency of oscillator 78, which subcarrier is then frequency-modulated on the microwave carrier of the responder instrument and then transmitted to the measurer instrument.

At the measurer instrument, the measurer and responder signals are combined and the measurer signal is detected by the detector 67, while the 70 kc. responder signal is detected by the detector 69. From the latter detector, the previously divided, 750 c.p.s. signal is detected by detector 92 and doubled by doubler 94, the doubled 1.5 kc. signal passing to the resolver 96. The 1.5 kc. measurer signal from detector 67 and the 1.5 kc. responder signal from resolver 96 are both passed to phase detector 100 for indication of the difference in phase shifts, which is proportional to the distance between instruments. This information, together with ambient conditions, such as wet- and dry-bulb temperatures and atmospheric pressure, may be fed to computer 106 for extremely accurate distance measurement. For example, distances up to 50,000 meters may be measured with an error less than plus or minus four parts per million plus or minus 1.5 cm.

As noted above, the phase shift is determined by a subtractive process. Besides canceling fixed-phase errors in the circuitry, taking the phase difference effectively doubles the phase shift on the highest resolution channel. This changes the required modulation wave length to 40 meters, which corresponds to a nominal frequency of 7.5 mc.

As phase measurement at 7.5 mc. requires complex and critical circuits, the 7.5 mc. signal is heterodyned down to 1.5 kc. The mixing process does not alter the phase-shift developed by the higher modulation frequency. The 1.5 kc. phase-shifted signal is accurately processed in a low-frequency resolver and phase detector.

The 7.5 mc. modulation signal permits measurements with a resolution of one cm. over one full cycle of phase shift, or 10 meters distance between units. With a single modulation frequency this measurement is repeated every 10 meters and is ambiguous. The additional modulation frequencies are provided with one full cycle of phase shift corresponding to 100 meters, 1,000 meters, 10,000 meters and 100,000 meters. Thus, nonambiguous measurements may be made over the full range of the instrument.

The modulation frequencies required to resolve longer distances are inversely proportional to the round-trip-range increments, i.e. 1.5 mc., 150 kc., 15 kc. and 1.5 kc. Circuits used to process these signals introduce nonuniform phase shifts over such a wide frequency range. The use of a narrow band of modulation frequencies serves to resolve the longer-range increments.

The relationship of phase differences, wherein the difference in phase shift of two frequencies equals the phase shift of the difference frequency, is employed for resolution of longer-range increments as illustrated in the following table:

MEASURER AND RESPONDER FREQUENCIES

| Channel | Measurer Frequency, mc. | Responder Frequency, mc. | Channel Difference | Frequency Difference | Distance, meters |
|---|---|---|---|---|---|
| 1 | 7.493875 | 7.493875 | | | |
| 2 | 7.490879 | 7.490879 | 2–1 | 14.984754 mc. | 10 |
| 3 | 5.995400 | 5.995400 | 3–1 | 1.498475 mc. | 100 |
| 4 | 7.344028 | 7.344028 | 4–1 | 149.847 kc. | 1,000 |
| 5 | 7.478891 | 7.478891 | 5–1 | 14.984 kc. | 10,000 |
| 6 | 7.492377 | 7.492377 | 6–1 | 1.498 kc. | 100,000 |

The distance measurement is obtained by combining the results of each set of phase differences. The 100-meter data is the difference between phase measurements of channel 3 and channel 1, the 1,000-meter data is the difference between phase measurements of channel 4 and channel 1, etc. The frequency difference (channel 3 and channel 1) is approximately 1.5 mc. and the frequency difference (channel 4 and channel 1) is approximately 150 kc. Therefore, phase shifts corresponding to four decades of frequency are evaluated using a narrow band of modulation frequencies. The actual frequencies used by the measurer are 5.993902–7.492377 mc. The measurer and responder frequencies on each channel are also approximately 1.5 kc. apart.

In practice, the actual measurer and responder frequencies may differ slightly from the nominal values to correct for index of refraction and velocity of light.

It is advantageous that the microwave-frequency generator be modulated by an automatic-frequency-control error signal in the responder in addition to the modulation frequency and subcarrier frequency. The AFC signal holds the responder klystron frequency 46.5 mc. from the measurer klystron frequency. Of course, movement of switch 82 to its "talk" position permits the substitution of voice signals for the modulation frequency to provide communication between instruments.

The isolator 61 serves to reduce the effects of voltage standing-wave ratio changes upon the klystron frequency, the termination having a low-voltage standing-wave ratio. The VSWR of the antenna is controlled to reflect a specified power level back into the hybrid T, which reflected power divides between the isolator and mixer. The incoming signal is similarly divided between the isolator and mixer.

From the foregoing, it is seen that the present invention provides an apparatus and method for geodetic surveying which accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. In a geodetic-surveying system, the combination comprising a pair of instruments each including a theodolite having a telescope mounted for rotation about vertical and horizontal axes, horizontal and vertical circles for determining the position of movement of said telescope about said axes, a directional antenna surrounding and mounted for movement with said telescope and in substantial axial alignment therewith, a carrier-frequency generator connected in transmitting relation with the antenna, the carrier frequencies of said generators being of a selected difference, a modulation-frequency oscillator for modulating each generated carrier frequency, a mixer connected in receiving relation with each generator and antenna for mixing the modulated carrier frequencies of both instruments to produce a data signal in each instrument, and a receiver connected to the mixer for receiving the data signal, connection means for connecting the receiver of one instrument to the generator thereof for transmitting the data signal of said one instrument to the other instrument, detector means connected to the receiver of said other instrument to detect the transmitted data signal, and phase-shift indicator means connected to said receiver and detector means of said other instrument to indicate the phase shift between the data signal of said one instrument and the transmitted data signal.

2. A geodetic-surveying system according to claim 1, in combination with frequency-change means in said connection means for transmitting the data signal of said one instrument at a changed frequency to avoid interference with said carrier frequencies, complementary frequency-change means connected between said detector and indicating means for returning the transmitted data signal to its original frequency.

3. A geodetic-surveying system comprising a pair of instruments each including a base, leveling means for supporting said base in level relation, a post on said base and disposed generally vertically when said base is level, a single support column offset radially from said post and having its lower end journaled on said post for rotative adjustment about the latter, shaft means extending horizontally from the upper region of said column and having its axis intersecting the axis of said post, a telescope carried by said shaft means in the plane of said intersecting axes, said telescope being adjustably rotatable about the shaft axis and rotatable with said shaft about the post axis, a directional antenna carried by said shaft surrounding said telescope and movable with the latter having its axis parallel to the axis of said telescope, and an electronic transceiver connected to said antenna and carried by said column, whereby the telescopes of respective instruments are movable into optical alignment to place said antenna in alignment for electronic communication.

4. A geodetic-surveying system according to claim 3, in combination with circular scales axially coincident with the post and shaft of each instrument for indicating the angular position of telescope movement.

5. A geodetic-surveying system according to claim 3, said transceivers each comprising a carrier-frequency generator connected in transmitting relation with the antenna, the frequencies of said generators being of a selected difference, a modulation-frequency oscillator for modulating each generator carrier frequency, the frequencies of said oscillators being of a selected difference, a mixer connected in receiving relation with each generator and antenna for mixing the modulated carrier frequencies of both instruments to produce a data signal in each instrument, a receiver connected to the mixer for receiving the data signal, connection means for connecting the receiver to the generator for transmitting the data signal of a selected instrument to the other instrument, detector means connected to the receiver to detect the transmitted data signal, and phase-shift indicator means connected to the receiver and detector means to indicate the phase shift between the data signal of a selected instrument and the data signal received from the other instrument.

References Cited by the Examiner
UNITED STATES PATENTS

| | | | |
|---|---|---|---|
| 2,479,565 | 8/1949 | Grossman | 343—100 |
| 2,629,289 | 2/1953 | Hunter | 343—7 X |
| 2,818,652 | 1/1958 | Baker | 33—69 X |
| 2,998,653 | 9/1961 | Haglund | 33—69 |
| 3,078,460 | 2/1963 | Werner et al. | 343—12 |
| 3,241,139 | 3/1966 | Wadley | 343—12 |
| 3,243,812 | 3/1966 | Williams | 343—12 |

CHESTER L. JUSTUS, *Primary Examiner.*

RODNEY D. BENNETT, *Examiner.*

J. P. MORRIS, *Assistant Examiner.*